April 17, 1962 I. J. P. JAMES ET AL 3,030,437

COLOUR TELEVISION APPARATUS FOR CONVERTING FIELD SEQUENTIAL TO SIMULTANEOUS SIGNALS

Filed Oct. 7, 1953

1

3,030,437
COLOUR TELEVISION APPARATUS FOR CONVERTING FIELD SEQUENTIAL TO SIMULTANEOUS SIGNALS

Ivanhoe John Penfound James, South Ealing, London, and Denis Gordon Perkins, Southall, England, assignors to Electric & Musical Industries Limited, Hayes, Middlesex, England, a company of Great Britain Filed Oct. 7, 1953, Ser. No. 384,704
Claims priority, application Great Britain Oct. 9, 1952
17 Claims. (Cl. 178—5.4)

Figure 1:
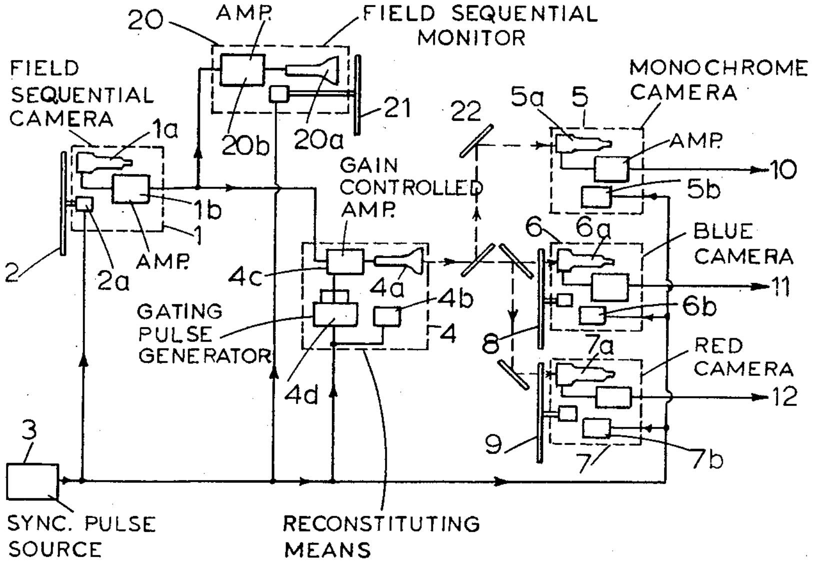

This invention relates to colour television. The invention has particular but not exclusive reference to a system of television such as is described in an article entitled "Specifications for Color T.V. Field Tests" appearing in "Electronics" January 1952 on page 126.

A system of the kind referred to possesses the advantage of compatibility so that while the signals sent out from the transmitter can be reconstituted in colour by a suitable designed colour receiver they are also capable of setting up an acceptable picture in monochrome when received by existing type monochrome receivers. For this purpose the system uses a special form of modulating signal for modulating the transmitted carrier wave and this form may be represented by $$E_M=E_Y+\frac{1}{1.4}\cdot\left(\frac{1}{1.78}(E_B-E_Y)\sin wt+(E_R-E_Y)\sin(wt\pm 90^\circ)\right)$$

Here $E_B$ and $E_R$ are signals representative of the blue and red colour components of the image to be transmitted and these signals are of simultaneous type. $E_Y$ is a signal representing the brightness variations of the image and may be derived either directly as a monochrome signal or else by compounding, in proportions referred to in said article, the signals $E_B$ and $E_R$ and a further similar signal $E_G$ representative of the green component of the picture so that the combined signal is suitable for applying to a monochrome reconstituting device. As will be seen the modulating signal $E_M$ in the above formula is formed as the sum of the monochrome signal $E_Y$ with two modulated oscillations of angular frequency $w$ and relative quadrature phase. One of the modulated oscillations is of amplitude proportional to $E_B-E_Y$ and the amplitude of the other modulated oscillation is proportional to $E_R-E_Y$. The significance of the $\pm$ signs in the term representing the last-mentioned oscillation is that the sense of the relative quadrature phase bettween the two modulated oscillations is reversed at the end of each scanning field. The advantage of this arrangement is that cross talk inevitable between the channels of the two oscillations is reduced in the finally detected output. In an interlaced system using 405 lines per picture and 50 fields per second the frequency $w$ may be chosen at 2.7 mc./s. So chosen said channels are included within the band of the monochrome signals $E_Y$ and in order to reduce interference patterns in a reconstituted picture deriving from these oscillations the frequency $w$ may be selected so as to be equal to an odd multiple of half the line repetition frequency and preferably also an odd multiple of half field repetition frequency. The monochrome signals $E_Y$ are arranged to possess high definition but the signals representative of the colour components in red and blue are of a lower definition since as is well known the eye is more sensitive of changes in brightness than changes in colour.

In one method of setting up signals according to the formula that has been given a camera may be employed using three pick-up tubes, one of which is arranged to set up the high definition monochrome signals $E_Y$ directly and the two remaining tubes are operated so that they

2 respectively provide at their outputs signals representative of the red and blue colour components in simultaneous manner with the monochrome signals $E_Y$. The modulation signal $E_M$ is then derived on the basis of these primary simultaneous signals. It will be appreciated that a camera arranged to accommodate the three pick-up tubes mentioned is inevitably complicated and undesirably bulky.

It is an object of the present invention to provide apparatus which can be used to generate modulating signals of the type referred to by means of a simpler camera incorporating only one pick-up tube.

A further object of the present invention is to provide apparatus for converting colour television signals of one type, for example the field sequential type, into colour television signals of a different type, for example a simultaneous type.

A further object of the present invention is to provide apparatus for converting colour television signals of the field sequential type having a relatively high field repetition rate into colour television signals of a different type having a lower field repetition rate.

A further object of the present invention is to convert colour television signals of the field sequential type into colour television signals of a simultaneous type including monochrome signals and signals of at least one component colour.

In carrying out one form of the present invention a camera having only a single pick-up tube is employed to generate colour television signals of the field sequential type. The camera co-operates with storage means and means associated therewith for converting the signals of the field sequential type of signals of a different type, and the storage means and associated means may be located separately with the remaining equipment of the television channel, which equipment unlike the camera is not required to be mobile. Moreover the storage means may be associated with suitable switching means so that it can serve for any one of a group of television cameras. In this case the monitoring of each of the cameras may be carried out by means of separate monitors reconstituting the signals of the sequential type and operating with the scanning field repetition frequency of the pick-up tube in the camera.

By arranging that all the image signals of the sequential type are utilised to produce one sequence of the signals of the different type, monochrome signals representing the brightness (luminance) of the object are produced. In this way the signals represented by $E_Y$ in the aforesaid formula can readily be produced.

Figure 2:
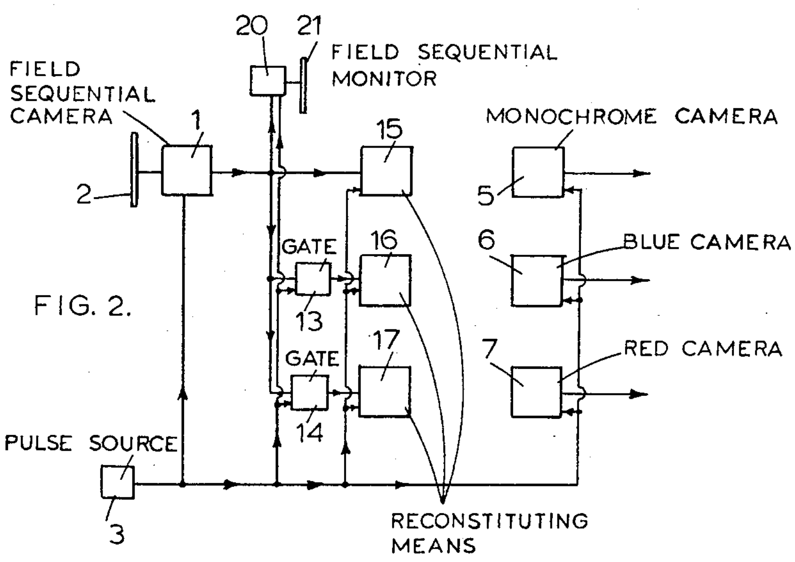

In order that the invention may be clearly understood and readily carried into effect, the invention will be described with reference to the accompanying drawings FIGURE 1 illustrates by means of a block diagram one example of the present invention, and FIGURE 2 illustrates a modification of FIGURE 1.

Referring to FIGURE 1 the rectangle 1 represents a colour television camera comprising a single pick-up tube *1a*, the usual head amplifier *1b*, and a rotating colour filter wheel represented by 2. The pick-up tube may be of any convenient type, for example it may be of the type which operates with cathode potential stabilisation, such as is described in the Journal of the Institute of Electrical Engineers, volume 97, part III, No. 50, page 383. It will be assumed, moreover, that the pick-up tube operates with a scanning field repetition rate of 150 fields per second. On operation of the camera, the colour filter wheel 2 is continuously rotated and the target of the pick-up tube is exposed to light transmitted through sectors of the rotating wheel so that during one scanning field the target of the tube is illuminated by red light from the object, an image of which is to be transmitted, and in another scanning field by blue light from the object and in a third scanning field by green light from the object. Signals may thus be generated in the output of the pick-up tube in the field sequence red, blue green. The scanning of the pick-up tube is controlled by synchronising pulses from a pulse source 3 and the filter wheel 2 is arranged to run in synchronism with these pulses, being driven by a motor 2*a*. The construction of the television camera for generating signals of the field sequential type representing different colour components of the object is well known in the art and will not be further described. The field sequential colour signals generated by the pick-up tube of the camera 1 are applied to reconstituting means represented at 4. This means includes a cathode ray tube 4*a*, the cathode ray beam of which is controlled by scanning means represented by the rectangle 4*b* to scan in synchronism with the cathode ray beam of the pick-up tube of camera 1 as a result of the application to the means 4*b* of synchronising pulses derived from the source 3. The reconstituting means 4 is such that there is produced on the luminescent screen of said cathode ray tube a monochrome picture having the scanning field repetition frequency of 150 fields per second.

The rectangles 5, 6 and 7 represent further cameras each of which includes a pick-up tube of charge storage type, such as the type above referred to. The pick-up tubes in the cameras 5, 6 and 7 are denoted by the references 5*a*, 6*a* and 7*a* respectively. Each of the cameras 5, 6 and 7 is however arranged to operate with a scanning field repetition rate of 50 fields per second under the control of scanning means represented by rectangles 5*b*, 6*b* and 7*b* synchronized by synchronising impulses from the source 3. Light from the reconstituting means 4 is caused to fall for example by means of a mirror system 22 on the cameras 5, 6 and 7 and, by providing a gain controlled amplifier 4*c* in said reconstituting means 4, and employing it to amplify the signals derived from the pick-up tube of the camera 1 to different degrees before said signals are applied to control the cathode ray tube of the means 4, the relative colour intensities of the signals derived from said pick-up tube of camera 5 may be adjusted so that these signals although initially of the nature of field sequential colour signals are nevertheless suited for satisfactory rendering in monochrome by a monochrome image reconstituting device. The gain of the amplifier 4*c* may be controlled by a circuit such as described in the "Proceedings of the I.R.E.," October 1951, page 1305, Figures 25 and 26, the changes of gain being timed by a colour gating pulse generator as described in that publication and which is represented in FIGURE 1 of the accompanying drawings by the block 4*d*.

Camera 6 is similar to camera 5 but is provided with a shutter device 8 so that the camera is only illuminated by light from the reconstituting means 4 when the camera 1 is scanning a blue field. The cathode ray beam of the pick-up tube of the camera 6 is scanned in the same way as that of the camera tube 5 and the signal derived from the camera 6 are signals simultaneous with the signals derived from the camera 5. The arrangement of the camera 7 is similar to that of camera 6 and the camera is provided with a shutter 9 similar to the shutter 8. The shutter 9, however, is arranged to expose the camera 7 only to light from the reconstituting means 4 when the camera 1 is scanning a red field. As in the instance of camera 6 the signals derived from camera 7 are signals simultaneous with those derived from the camera 5. Camera 5 thus feeds monochrome signals of the type represented by $E_Y$ in the previously mentioned formula to the channel 10. Camera 6 feeds signals representative of the blue component $E_B$ to the channel 11 and the camera 7 feeds signals $E_R$ representative of the red component to the channel 12. As will be apparent these signals are simultaneous signals with a scanning field repetition rate of 50 fields per second. Such signals may be utilised for generating the modulation waveform $E_M$ above referred to.

It will now be appreciated that the reconstituting means 4 produces a monochromatic light image of each sequence of colour signals produced by the camera 1. The pick-up tube in the camera 5 is exposed to all the light images reproduced by the means 4 and consequently the charges stored on the target of this tube (the tube as aforesaid being of the charge storage type) constitute the representation of the brightness of the object being televised. The development of the signals representing the brightness of the object being televised, in other words the monochrome signal, has therefore been achieved in a single storage pick-up tube 5*a* and the signal in the channel 10 can be transmitted directly as a monochrome signal without subsequent modification. As the three superimposed red, green and blue pictures on the display tube 4*a* are perfectly registered because of the inherent registration of the field sequential system, it is possible to obtain a very good definition in the monochrome channel. The pick-up tube in the camera 6 on the other hand is exposed only to the light image representing the blue colour signals generated by the camera 1. The target of the pick-up tube in the camera 6 therefore stores a representation of each sequence of blue colour signals. Similarly the target of the camera 7 stores a representation of each sequence of red colour signals. The scanning of the targets in the pick-up tubes of the cameras 5, 6 and 7 produces signals of the simultaneous type which can be utilised to produce a modulating signal conforming to the formula in the second paragraph of the specification, for this purpose the signals from the cameras 6 and 7 being caused to modulate a carrier wave of frequency *w*. The representations of the different sequences of signals generated by the camera 1 and stored in the targets of the pick-up tubes of the cameras 5, 6 and 7 are continuously scanned with a scanning field repetition rate lower than the scanning field repetition rate in the camera 1. That is to say the target of the pick-up tube in each of the cameras 5, 6 and 7 is exposed to a complete field traversal of the scanning beam during each interval of 1/50 second, there being no interval between successive field traversals other than the normal field suppression interval.

The shutters 8 and 9 may be apertured discs rotated in synchronism with the colour filter wheel 2 and they are represented as such in the drawing. Alternatively, if desired the shutters 8 and 9 may be replaced by fixed blue and red colour filters respectively and a colour wheel, similar to the colour filter wheel 2 employed by camera 1, mounted in front of the luminescent screen of the reconstituting means 4. By correctly synchronising the colour filter wheels camera 6 may be rendered responsive only to signals representative of the blue component and camera 7 responsive only to signals representative of the red component. It will be appreciated that the use of colour filter wheels reduce the light that is available at the targets of the pick-up tubes of the cameras 6 and 7 from the reconstituting screen of the means 4 and for this reason the use of shutters is to be preferred.

The rectangle 20 represents monitor means, comprising a conventional image reproducing tube 20*a* preceded by an amplifier 20*b* to which the signals set up by the camera 1 are fed for monitoring purposes. The monitoring means operates in colour sequential manner at 150 fields per second under the control of impulses from the source 3. Reference 21 indicates a colour filter wheel similar to the wheel 2 and arranged to run in synchronism with this wheel. As mentioned above there may be provided a number of cameras such as the camera 1 of which by suitable switching means any one camera may be selected to feed signals to the reconstituting means 4, each camera having associated with it a corresponding monitor such as the monitor 20.

FIGURE 2 shows a modification of the arrangement of FIGURE 1. In this modification the camera 1 operates in conjunction with the colour filter wheel 2 under the control of impulses from the source 3 in a manner identical with the arrangement of FIGURE 1. Furthermore the cameras, 5, 6 and 7 are similar to those represented by the same references in FIGURE 1 and apply similar signals to the channels 10, 11 and 12. These cameras are controlled in the same manner by the source 3. The reconstituting means 4, however, is replaced by three separate reconstituting means 15, 16 and 17. Light from the reconstituting means 15 is caused to fall on the camera 5, that from the reconstituting means 16 upon camera 6 and light from the reconstituting means 17 falls upon camera 7. The reconstituting means 15 is similar to the reconstituting means 4 and is operated and controlled in the same manner. The reconstituting means 16 and 17 on the other hand although otherwise similar to the means 4 are not provided with a gain controlled amplifier as is the reconstituting means 15. Moreover although the scanning of the means 16 and 17 is performed in the same manner as is that of the means 15 the signals that are fed to means 16 and 17 are applied through respective gating circuits 13 and 14. These gating circuits which may be of a variety of known constructions are controlled by impulses from the source 3 which are such that the gating circuit 13 only permits signals to be passed to the reconstituting means 16 when the camera 1 is scanning a blue field. Likewise the gating circuit 14 is controlled so that signals from the camera 1 are only applied to the reconstituting means 17 when the camera 1 is scanning a red field. The monitor 20 serves the same functions as the monitor 20 in the arrangement of FIGURE 1.

As aforesaid, the pick-up tubes employed in the cameras 5, 6 and 7 are each of the charge storage type and, as will be well known, this implies that each of the pick-up tubes has a target which is capable of storing charges representative of intensity variations in light images to which the camera is exposed. If the pick-up tubes are of the construction described in the aforesaid Journal of the Institute of Electrical Engineers, the signal output is obtained, on scanning the target of the electron beam, from a signal plate forming part of the charge storage target. When tubes of this construction are employed spurious currents are liable to be set up in the output circuits of such pick-up tubes of the kind known as photopulse currents. In the absence of steps to remove such currents undesired patterns become superposed on the final picture to a noticeable degree. The intensity of such patterns may be largely reduced by the use of phosphors of long lag for the screen of the associated reconstituting device. It is furthermore possible to expose a photo-cell to light from the reconstituting device and to feed currents derived from the photo-cell to the output circuit of the pick-up tube in opposite sense so as to cause cancellation of the spurious currents. Alternatively the signals that are applied to the reconstituting device may be utilised for the purpose of cancellation after being passed through a circuit for suitably modifying these signals both in amplitude and phase. On the other hand the use of a pick-up tube of signal plate variety may be avoided and a tube of multiplier orthicon type may be employed which since it utilises the reflected beam for deriving the output signal is not subject to photo-pulse effect.

It will be appreciated that the pick-up tubes employed in the apparatus illustrated in FIGURE 1 and FIGURE 2 may either be of the kind in which the target is exposed directly to the light image, or of the image kind in which a photo-cathode is provided to convert the light image to an electron image which is in turn projected on the target scanned by the electron beam.

It will be appreicated that by the use of pick-up tubes of storage kind in cameras 5, 6 and 7 the scanning of said cameras may if desired be operated independently of the scanning of camera 1 and the associated means 15, 16, 17 and 20. It may however be desirable to arrange that frame scanning is carried out in a locked manner. If desired the scanning of cameras 5, 6 and 7 may be effected in interlaced manner whereas the scanning of 1, 15, 16, 17 and 20 may operate non-interlaced.

The optical means 22 required for directing light from the reconstituting means upon the cameras 5, 6 and 7 have merely been shown symbolically. Thus light from the means 4 being directed separately upon the cameras 5, 6 and 7 by known beam splitting technique using partially transmitting partially reflecting mirrors. However, it will be realized that such optical means may be of any known convenient form. If desired the pick-up tubes of cameras 5, 6 and 7 may be arranged side by side in front of the means 4 and with the pick-up of the camera 5 which is required to provide monochrome type signals of high definition disposed directly opposite the screen of the means 4. Distortion of the image that may occur in the cameras 6 and 7 due to their location off the optical axis of the means 4 may be corrected by suitably distorting the waveform of the scanning curents used to effect the scanning of those cameras. As however cameras 6 and 7 have only to supply colour signals of relatively low definition the accuracy of correction will not require to be so great as would be necessary with signals of the definition required from camera 5.

In a modification of the arrangement shown in FIGURE 1 instead of modifying the proportions of the three primary signals applied to the means 4 in a gain controlled amplifier to form the monochrome signal $E_Y$, it is possible to arrange a synchronous shutter in front of camera 5 having three neutral density filters chosen to obtain the correct proportions of the three primaries from the camera 5 to produce a suitable monochrome signal. Alternatively the synchronous shutter can be arranged to have different on-off ratios to proportion three primaries correctly. These modifications are preferable in order to increase the signal/noise ratios in the red and blue channels 6 and 7 since equal signals can be used for the three primary signals applied to means 4.

Where as aforesaid a colour wheel similar to 21 is placed in front of means 4 the monochrome signal proportions for the camera 5 can be obtained as already outlined, or by the use of a colour filter of the correct spectral characteristic to modify the colour picture displayed by means 4.

As decsribed no account has been taken of the non-linearity of colour receiver reproducers. In general cathode ray reproducers have a characteristic such that the light output is proportional to the input modulating voltage raised to a certain power, roughly equal to 2.2. This power is usually referred to as the "gamma" of the tube. For correct colour reproduction it is necessary that a unity overall system gamma is obtained. This implies that the signal voltage applied to the reproducer is proportional to the 2.2th root of the light output required. If the pick-up tube employed has a linear characteristic then it is necessary to pass the signals through a non-linear circuit having a characteristic conforming to a fractional power law, such as described for example in the specification of United States Patent No. 2,269,001, to preserve the overall gamma of unity. Even if a value of unity is not found to be the most pleasing value, the principles still apply insofar as all receivers must be matched for equal gammas. In compatible colour television systems it is usual to transmit the monochrome signal as a signal proportional to the luminance of the light to be televised. However, the necessity of having to introduce gamma correction raises a number of problems.

One method of gamma-correction is to transmit the monochrome signal in the form $$E_Y{}^1 = aE_R{}^{1/\gamma} + bE_G{}^{1/\gamma} + cE_B{}^{1/\gamma}$$

where $E_R$, $E_G$ and $E_B$ are voltages proportional to the red, green and blue components of the light analysed, *a*, *b* and $c$ are constants and $\gamma$ is the gamma of the reproducer tube.

The conversion system of the present application lends itself readily to the application of this form of gamma correction as will be illustrated with reference to FIGURE 2. Thus the signals applied to the reconstituting means 20 are made proportional to $E_R^{1/\gamma}$, $E_G^{1/\gamma}$ and $E_B^{1/\gamma}$, if necessary in the case of a linear pick-up tube by using a fractional power law circuit in the field sequential channel 1. The light output from tube 20 is therefore directly proportional to the light of the original scene. Assuming that the storage tubes 5, 6 and 7 have linear characteristics, then in order to correct the gamma of the compatible signals in channels 10, 11 and 12 fractional power law circuits are included prior to the inputs to reconstituting means 15, 16 and 17, i.e. the signals applied to 15 are proportional to $$(aE_R^{1/\gamma})^{1/\gamma}+(bE_G^{1/\gamma})^{1/\gamma}+(cE_B^{1/\gamma})^{1/\gamma}=(E_Y^1)^{1/\gamma}$$

The final signal output 10 is then of the form $E_Y^1$ as required.

A disadvantage of this method is that the monochrome signal is then not the true luminance signal. Another method of gamma correction is to make the monochrome signal of the form $E_Y^{1/\gamma}=(aE_R+bE_G+cE_BO)^{1/\gamma}$. This represents a true luminance signal, but introduces a slight error in the chromaticity of the reconstituted picture. Here again the arrangement is readily adapted to the conversion system and will now be described in connection with FIGURE 2. In this case the signals applied to device 15 are mixed to form a signal $$[(aE_R)^{1/\gamma}+(bE_G)^{1/\gamma}+(cE_B)^{1/\gamma}]$$

This produces a light output proportional to $$(aE_R+bE_G+cE_B)$$

The output of the linear tube 5 is then passed through a fractional power law circuit producing a signal of the required form $$(aE_R+bE_G+cE_B)^{1/\gamma}=E_Y^{1/\gamma}$$

It is believed that a pick-up tube of the full storage type (for example, cathode potential stabilised type) when used in a field sequential system produces less colour fringing them than other types, because of the time required to build up the charge on the mosaic elements. Furthermore, the use of such tubes (photo-conductive as well as photo-emissive types) in the storage devices 5, 6 and 7 will also tend to reduce this defect by blurring in the final signals 10, 11 and 12.

Beating patterns may be produced in this system more particularly if the number of lines in the two systems are not identical. These patterns may be reduced in known manner by the application of "spot wobbling" to the reconstituting devices 15, 16 and 17, or alternatively by broadening the scanning spot in a direction at right angles to the direction of line scanning as for example by the means described in the specification of United States Patent No. 2,613,333 and British patent application No. 14776/52.

A further method of avoiding line beating is to use a field sequential system in which the line scanning is arranged vertically instead of horizontally. The device 5 then scans the picture reproduced by means 15 at right angles to the lines on means 15.

It may be preferable to arrange that the light from devices 15, 16 and 17 is the inverse (negative) of the original, in other words, black in the original scene corresponds to white from these devices. This method reduces halo effects and thereby improves the contrast range of the converter. Care will have to be taken to gamma correct the signals in an appropriate manner (inverse gamma to normal). In addition, it should reduce the line beating effect mentioned previously, because of the spot enlarging which occurs in the high lights in the majority of cathode ray tubes. Since the high lights on tube 15 cause the spot to defocus and similarly cause the tube 5 to "pull" it is apparent that the definition is worsened for the "blacks" in the final picture. Since the visual acuity of the eye is worse in the "blacks" this method is particularly advantageous in preserving good definition in the greys and whites.

It is known that the camera taking characteristics in a field sequential colour television system involve negative lobes which are not realisable in practice. It is therefore not possible to obtain true colour reproduction of all colours in the triangle formed by the position of the receiver primaries on the usual $x$, $y$ and $z$ chromaticity diagram. In simultaneous colour television systems it is possible to make use of solely positive camera taking characteristics and by the use of so-called matrix techniques to transform linearly the camera outputs to produce signals of the correct form to match all colours within the received colour triangle. Thus camera taking characteristics corresponding to the International Illumination Commission's $\overline{X}$, $\overline{Y}$ and $\overline{Z}$ distribution coefficients may be chosen and by a suitable matrix the outputs may be matched to produce the required R, G and B tristimulus values.

According to a feature of the invention matrixing techniques can be applied after the storage devices 5, 6 and 7 to correct for errors in the colour reproduction. Thus $\overline{X}$, $\overline{Y}$ and $\overline{Z}$ taking characteristics can be used in the field sequential camera, and although colour errors will be apparent on the field sequential monitors, these can be corrected by matrixing the converted signals of simultaneous form. The same technique can be applied to reduce errors due to "hangover" in either the field sequential camera pick-up tubes and/or the field sequential reconstituting devices 15, 16 and 17.

What we claim is:

1. Apparatus for converting colour television signals of the field sequential type into colour television signals of a different type comprising storage means, means for applying the signals of the field sequential type to said storage means during fields of different colours to superimpose the signals applied during the fields of different colours, other storage means, means for applying the signals of the field sequential type to said other storage means during fields of one colour, means for reproducing signals from said first storage means to derive signals representing mixed colours, and means for reproducing signals from said other storage means to derive signals representing a component colour.

2. Apparatus for converting colour television signals of the field sequential type having a relatively high field repetition rate into colour television signals of a different type having a lower field repetition rate, comprising storage means, means for applying the signals of the field sequential type to said storage means during the fields of different colours to superimpose the signals applied during the fields of different colours, other storage means, means for applying the signals of the field sequential type to said other storage means during fields of one colour, means for reproducing signals from said first storage means at said lower field repetition rate to derive monochrome signals, and means for simultaneously reproducing signals from said other storage means at said lower field repetition rate to derive signals representing a component colour.

3. Apparatus for converting colour television signals of the field sequential type into colour television signals of a different type, comprising display means responsive to the signals of the field sequential type for producing light images of said signals, a pick-up tube of the charge-storage type responsive to light images produced by said display means during fields of different colours, another pick-up tube of the charge-storage type responsive to light images produced by said display means only during fields of one colour, whereby monochrome signals can be derived from said first pick-up tube and signals representing a component colour can be derived from said other pick-up tube.

4. Apparatus for converting colour television signals of the field sequential type having a relatively high field repetition rate into colour television signals of a different type having a lower field repetition rate, comprising display means responsive to the signals of the field sequential type for producing light images of said signals, a pick-up tube of the charge-storage type operative at said lower field repetition rate responsive to light images produced by said display means during fields of different colours, another pick-up tube of the charge-storage type operative at said lower field repetition rate responsive to light images produced by said display means only during fields of one colour, whereby monochrome signals can be derived from said first pick-up tube and signals of a component colour can be derived from said other pick-up tube.

5. Apparatus for converting colour television signals of the field sequential type into colour television signals of a different type, comprising display means for producing a light image of applied signals, means for applying the signals of the field sequential type to said display means to cause the display means to produce a light image of each field of said signals, an image pick-up tube of the charge-storage type disposed for exposure to light images produced by said display means, at least one further image pick-up tube of the charge-storage type disposed for exposure to light images produced by said display means, and means for rendering said further pickup tube unresponsive to light images during fields of all but one colour, whereby monochrome signals can be derived from said first pick-up tube and signals representing a component colour can be derived from said other pick-up tube.

6. Apparatus for converting colour television signals of the field sequential type into colour television signals of a different type, comprising display means for producing a light image of applied signals, means for applying the signals of the field sequential type to said display means to cause the display means to produce a light image of each field of said signals, a pick-up tube of the charge-storage type disposed for exposure to light images produced by said display means, further display means for producing a light image of applied signals, means for applying the signals of the field sequential type to said further display means only during fields of one colour to cause said further display means to produce a light image of each field of said colour, and a further image pick-up tube of the charge-storage type disposed for exposure to said further display means, whereby monochrome signals can be derived from said first pick-up tube and signals of a component colour can be derived from said further pick-up tube.

7. Apparatus for converting colour television signals of one type into colour television signals of a different type, comprising display means for producing a light image of applied signals, means for applying the colour signals of said first type to said display means with negative polarity to cause said display means to produce inverted light images of said signals, and means including a pick-up tube of the charge storage type disposed for exposure to light images produced by said display means for deriving colour television signals of said different type.

8. Apparatus for generating image signals for colour television comprising a television camera for producing colour television signals of the field sequential type having a relatively high field repetition rate, storage means, means for applying signals derived from said camera to said storage means during fields of different colours to superimpose the signals applied during the fields of different colours, other storage means, means for applying signals derived from said camera to said other storage means only during fields of one colour, means for reproducing signals from said first storage means at a lower field repetition rate to derive monochrome signals, and means for simultaneously reproducing signals from said other storage means at said lower field repetition rate to derive signals representing a component colour.

9. Apparatus for generating image signals for colour television comprising a pick-up device for scanning an object in line-by-line manner to produce colour television signals a storage target, means for applying signals derived from said pick-up device to said target, and means for scanning said target in line-by-line manner to derive modified colour television signals, the line scanning direction of said target being perpendicular to the line scanning direction of said pick-up device.

10. Apparatus for converting colour television signals of the field sequential type having a relatively high field repetition rate into colour television signals of a different type having a lower field repetition rate, comprising first storage device, means for applying the signals of the field sequential type to said first storage device at least during each field of one colour, second storage device, means for applying signals of the field sequential type to said second storage device during each field of another colour, means for continuously reproducing signals from said first storage device at said lower field repetition rate, and means for continuously reproducing signals from said second storage device at said lower field repetition rate.

11. Apparatus according to claim 10 each storage device comprising a target of a pick-up tube of the charge-storage type.

12. Apparatus according to claim 1, said means for applying signals to said first storage means including a variable gain amplifier, and means for switching the gain of said amplifier to different values during fields of different colours.

13. Apparatus for developing colour television signals which comprises a sequential colour pickup camera for developing a sequential colour video signal of which successive portions represent different colour components of an object field, signal reproducing means including at least one cathode ray tube for reproducing from said colour video signal images corresponding to said successive portions in sequence, a plurality of pickup scanning devices associated with said signal reproducing means for producing video signals from said images, switching means presenting images representing different colour components to different scanning devices to thereby develop respective video signals representing different colour components, and means supplying portions of said sequential colour video signal representing a plurality of different colour components to at least said one cathode ray tube to produce sequentially thereon images corresponding to different colour components, one of said scanning devices responding to the images on said one cathode ray tube to develop a corresponding video signal representing a plurality of colour components.

14. Apparatus for developing colour television signals which comprises a sequential colour pickup camera for scanning an object field at line and field frequencies to develop a sequential colour video signal of which successive portions represent different colour components, signal reproducing means including at least one cathode ray tube for reproducing from said colour video signal images corresponding to said successive portions in sequence, a plurality of storage pickup scanning devices associated with said signal reproducing means for producing video signals from said images, deflection means for deflecting said scanning devices at common line and field frequencies with the field frequency substantially lower than that of said sequential camera, switching means presenting images representing different colour components to different scanning devices to thereby develop respective video signals representing different colour components, and means supplying portions of said sequential colour video signal representing a plurality of different colour components to at least said one cathode ray tube to produce sequentially thereon images corresponding to different colour components, one of said scanning devices responding to the images on said one cathode ray tube to develop a corresponding video signal representing a plurality of colour components.

15. Apparatus for developing colour television signals which comprises a three colour field sequential colour pickup camera for scanning an object field at line and field frequencies to develop a field sequential colour video signal of which successive portions represent successive field scansions in different primary colours, signal reproducing means including at least one cathode ray tube for reproducing from said colour video sgnal images corresponding to said successive portions in sequence, deflection means for said signal reproducing means operating in synchronism with said camera and at like line and field frequencies, a plurality of storage pickup scanning devices associated with said signal reproducing means for producing video signals from the said images thereon, deflection means for deflecting said scanning devices at common line and field frequencies with the field frequency substantially lower than that of said sequential camera, switching means presenting images representing only one colour component to one of said scanning devices and only another colour component to another scanning device, means supplying portions of said sequential colour video signal representing a plurality of different colour components to at least said one said cathode ray tube to produce sequentially thereon images corresponding to different colour components, a third of said scanning devices responding to the images on said one cathode ray tube to develop a corresponding video signal representing a plurality of colour components, and means for altering the relative image intensities of different colour components to which said third scanning device responds.

16. Apparatus for developing colour television signals which comprises a sequential colour pickup camera for developing a sequential colour video signal of which successive portions represent different colour components of an object field, a plurality of cathode ray tubes for reproducing from said colour video signal images corresponding to said successive portions in sequence, switching means supplying signals representing different colour components to different cathode ray tubes, at least one of said cathode ray tubes being supplied with video signal portions representing a plurality of different colour components, and a plurality of pickup scanning devices associated with respective cathode ray tubes for producing respective video signals from images thereon.

17. Apparatus for developing colour television signals which comprises a field sequential colour pickup camera for scanning an object field at line and field frequencies to develop a field sequential colour video signal of which successive portions represent successive field scansions in different colour components, a plurality of cathode ray tubes for reproducing from said colour video signals images corresponding to successive field scansions, switching means synchronized with said field scansions for supplying signals representing different colour components to different cathode ray tubes, at least one of said cathode ray tubes being supplied with video signal portions representing a plurality of different colour components, a plurality of storage pickup scanning devices associated with respective cathode ray tubes for producing respective video signals from images thereon, deflection means for deflecting said scanning devices at common line and field frequencies with the field frequency substantially lower than that of said sequential camera, and means for sequentially altering the relative image intensities of different colour components effective at the scanning device associated with said one cathode ray tube to yield a respective output video signal whose colour components have relative values different from those in the initial sequential signal.

References Cited in the file of this patent

UNITED STATES PATENTS

| | | |
|---|---|---|
| 2,531,031 | France | Nov. 21, 1950 |
| 2,545,957 | Kell | Mar. 20, 1951 |
| 2,587,005 | Smith | Feb. 22, 1952 |
| 2,587,006 | Smith | Feb. 22, 1952 |
| 2,868,870 | Goldmark | Jan. 13, 1959 |